United States Patent Office 3,419,342
Patented Dec. 31, 1968

3,419,342
PROCESS FOR DYEING POLYPROPYLENE FIBERS CONTAINING A NICKEL PHENOLATE OF A BIS(p-ALKYLPHENOL) SULFONE
Albert S. Matlack, Hockessin, Del., assignor to Hercules Incorporated, a corporation of Delaware
No Drawing. Filed Aug. 13, 1965, Ser. No. 479,629
7 Claims. (Cl. 8—46)

This invention relates to a process for dyeing fibers of stereoregular polypropylene. More particularly, this invention relates to a process for producing color and light fast dyeings on stereoregular polypropylene substrates with nickel complexing dyestuffs.

It is well known that filamentary articles made from stereoregular polypropylene, a highly crystalline polymer that melts in the range of about 165° C. to about 172° C., have wide application in textiles, carpet manufacture, etc., since they possess excellent physical properties such as excellent tenacities, superior fatigue and abrasion resistance, and the like. One of the difficulties encountered in such applications has been in the production of color fast dyeings. For wide acceptability, the dyeing must be reasonably color fast when subjected to washing and to dry cleaning treatments, and also reasonably stable and color fast to light. Dyeing of polypropylene fiber, however, has been recognized as an especially difficult problem because of the extremely hydrophobic nature of stereoregular polypropylene and the absence of functional groups in its structure which can serve as "dye sites" to enable dyestuffs to become firmly attached to the fibers. As a consequence, dyeing methods developed for other fiber materials of a hydrophobic nature have proven to be deficient for dyeing stereoregular polypropylene fibers, particularly with respect to resistance to color fading or change when laundered, dry cleaned or exposed to light.

In accordance with this invention it has been found that when a substrate of stereoregular polypropylene containing a nickel phenolate of a bis(p-alkylphenol) sulfone is contacted with an ortho-nitrosophenol in a liquid medium at elevated temperature, the ortho-nitrosophenol reacts with the nickel phenolate to produce a colored dyestuff in the polypropylene substrate. Stereoregular polypropylene fibers dyed in accordance with this invention are uniformly penetrated throughout by the dyestuff so produced, and the dyeings are characterized by excellent levelness of color, excellent color fastness to conventional washing and scouring treatments, and to conventional dry cleaning treatment, and by greatly improved color fastness to light.

As pointed out above, the stereoregular polypropylene substrates to be dyed in accordance with this invention contain a nickel phenolate of a bis(p-alkylphenol) sulfone which reacts, probably by chelation, or sequestering, with the characteristic

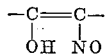

groups in the nitrosophenol compound to form the dyestuff. In order to assure the presence of the chelatable nickel phenolate uniformly distributed within the body of the polyolefin substrate at the time of dyeing, the nickel phenolate compound can be introduced into the polyolefin at any convenient point in the manufacture thereof prior to the formation of the substrate, i.e., prior to extrusion, molding or spinning. For example, the nickel phenolate can be added to the reaction mixture at or after the termination of the polymerization, or can be incorporated into manufactured stereoregular polypropylene flake or granules by malaxating the polyolefin with the nickel phenolate on a hot two-roll mill, or in a Banbury mixer, or in the barrel of a heated extruding apparatus, including the hot melt extruding apparatus for spinning the fibers.

The nickel compounds that can be incorporated in the polypropylene and so used for the production of the dyestuffs are also effective light stabilizers for polypropylene and it was most surprising to discover that not only did they react with the nitrosophenols to produce the dyestuff in the fiber, they did so without destruction of their ability to stabilize against the effects of light. Nickel compounds that are effective in this invention are the nickel phenolates of bis(p-alkylphenol) sulfones. The nickel in such compounds may replace all or part of the phenolic hydrogens of the bis(p-alkylphenol) sulfones. Hence, the ratio of nickel atoms per molecule of bis(p-alkylphenol) sulfone can vary from 1 to 2. Obviously mixtures of such nickel compounds can be used, in which case the average of nickel atoms per bis(p-alkylphenol) sulfone will be a figure between 1 and 2. These nickel phenolates may then be expressed as those having the formula

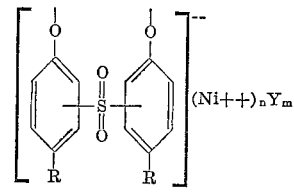

where R is an alkyl radical containing 1 to 20 carbon atoms, Y is an anion, $n$ is a number from 1 to 2 and $m$ is $$\frac{2n-2}{v}$$

where $v$ is the valence of the anion Y. Exemplary of the nickel phenolates that are incorporated in the polypropylene are the nickel phenolates of o,o'-bis(p-cresol) sulfone, o,o' - bis(p - ethylphenol) sulfone, o,o' - bis(p - isopropylphenol) sulfone, o,o' - bis(p - tert - butylphenol) sulfone, o,o' - bis(p - amylphenol) sulfone, o,o'-bis(p-octylphenol) sulfone, e.g., o,o'-bis(p - 1,1,3,3 - tetramethylbutylphenol) sulfone, o,o' - bis(p - nonylphenol) sulfone, o,o'-bis(p-dodecylphenol) sulfone, and the like, and the corresponding o,m'-bis(p-alkylphenol) sulfones.

The salt-forming anion that may be present in said compounds can be varied widely. Preferred anions include hydroxyl, alkoxy, acyloxy, oxide, halide, sulfate, nitrate, phosphate, thiocyanate, cyanide, p-toluenesulfonate, methanesulfonate, phosphite, aryl and alkyl phosphonates, molybdate, and the like. Typical alkoxy radicals include methoxy, ethoxy, octyloxy, decyloxy, propoxy, butoxy, amyloxy, and dodecyloxy.

The chelated nickel-orthonitrosophenol molecule complexes formed in accordance with this invention may be complexes in which one nickel atom is chelated with one nitrosophenol molecule, or complexes in which one nickel atom is chelated with two nitrosophenol molecules, or may be a mixture of both types. For optimum results, the amount of nickel phenolate employed should be sufficient to supply at least one chelatable metal atom for each orthonitrosophenol molecule. However, the amount of nickel phenolate, based on substrate weight, may vary from minute amounts, less than 0.1%, to amounts on the order of 5% or more.

Nitrosophenols that can be used to react with the nickel phenolate in the polypropylene fiber to produce the fast dyeing are 5-methoxy-2-nitrosophenol, 5-dimethylamino-2-nitrosophenol, 1-nitroso-2-naphthol, 2-nitroso-1-naphthol, 3-carboxy-1-nitroso-2-naphthol, 3-bromo-1-nitroso-2-naphthol, 3-chloro-1-nitroso-2-naphthol, 1-nitroso-2, 6 - naphthalenediol, 2 - hydroxy-1-nitroso-anthracene, 1-hydroxy-2-nitrosofluorene, 2-hydroxy-1-nitrosocarbazole, etc., and dye intermediates that yield a nitrosophenolic configuration by virtue of enolization, as for example the tautomeric form of acenaphthenequinone monoxime.

The actual dyeing operation can be carried out in a wide variety of ways. One method of carrying out the process of this invention is to wet the stereoregular polypropylene in the form of filament, staple fiber, thread, yarn, cord, or fabric woven from such fibers, and containing a nickel phenolate of a bis(p-alkylphenol) sulfone in an aqueous scouring bath containing about 1% by weight of an ionic or nonionic wetting agent, based on the weight of the fibers. The substrate is rinsed and then immersed in an aqueous dye bath containing about 1% by weight of the substrate of the ortho-nitrosophenol at a liquor to substrate ratio of about 100 to about 5 to 1, and preferably at about 50 to about 30 to 1. The temperature of the dye bath is raised to from about 50° C. to about 98° C., and preferably to the boil. The pH of the dye bath is adjusted with dilute acetic or formic acid to about 5 to 6. The dye bath is maintained at the elevated temperature for about 1 to about 2 hours. The dyed substrate is then removed from the bath, thoroughly rinsed with warm water and then scoured in an aqueous bath at about 70° C. to 90° C. and containing about 1% by weight of an ionic or nonionic wetting agent, and enough soda ash to bring the pH to about 9 to 10. After thoroughly rinsing with water, the substrate is dried.

The above embodiment describes a suitable procedure in accordance with this invention for immersion dyeing of stereo-regular polypropylene substrates, such as yarn in skein form or loose fabric. The invention, however, is by no means limited to such immersion dyeing of stereo-regular polypropylene fibrous material, as set forth above, since the invention is readily adaptable to commercial machinery and techniques for kier, package and rope dyeing, continuous dyeing by padding or jig procedures.

The process of this invention can also be used in printing operations, the nitrosophenol compound being applied to the polypropylene fabric by printing techniques, such as print pastes or electrostatic techniques, and the color then developed by heat, steam, etc.

In order that the reaction between the nickel phenolate of the bis(p-alkylphenol) sulfone and the nitrosophenol will take place, the polypropylene filamentous material containing the nickel phenolate is heated with the nitrosophenol in the presence of water or other proton donating solvent such as ethanol, acetone or aqueous mixtures of these. As described above, this is readily done by using a solution or dispersion of the nitrosophenol in a liquid medium containing at least 25% of water, or other proton donating solvent. The temperature at which the reaction is carried out can be from about 50° C. to about 150° C. Generally, it is conveniently carried out at the boiling temperature of the dye bath.

Obviously, many other variations can be made in carrying out the process of this invention. Thus, the polypropylene from which the filamentous material is made can contain other additives in addition to the nickel phenolate of a bis(p-alkylphenol) sulfone, as for example, other stabilizers for heat, light, and the like, extrusion aids, mold corrosion inhibitors, antistatic agents. delustrants, etc.

EXAMPLE 1

A fabric knit from 210 denier, 35 filament, stereoregular polypropylene continuous filament yarn, containing 0.75% by weight, based on the fabric weight, of the nickel phenolate of bis(p-tetramethylbutylphenol) sulfone (containing 0.12% nickel), was thoroughly wetted out in an aqueous bath containing 1% by weight, based on the fabric weight of a nonionic wetting agent, of the alkylphenoxy poly(ethyleneoxy)ethanol type known as Igepal CO 630. The fabric was removed from the bath, rinsed well and then immersed in an aqueous dye bath maintained at 60° C. and containing 1% by weight of the fabric of 1-nitroso-2-naphthol, at a liquor to fabric ratio of 40:1, the 1-nitroso-2-naphthol having been added to the bath as a concentrate prepared by dissolving 0.05 part of 1-nitroso-2-naphthol in 4 parts by volume of a 1:1 mixture of acetone:benzene and then adding 1 part by volume of a 2.5% aqueous solution of Igepal CO 630 to the concentrate at room temperature. The temperature of the dye bath was raised to the boil in 10–15 minutes, the bath acidified with acetic acid to a pH of 5–5.5, and the dye bath maintained at the boil for 1 hour. The fabric was next removed from the bath, and was thoroughly rinsed with warm water. The dyed fabric was then subjected to a hot scour for 10–15 minutes at the boil at a 40 to 1 liquor to fabric ratio by weight in an aqueous bath containing 1% Igepal CO 630 and adjusted to a pH of 8–9 with sodium carbonate. The fabric was removed, thoroughly rinsed with water, dried and tested.

This fabric was dyed golden-yellow and exhibited excellent wash, crock and dry cleaning fastness when subjected to AATCC test methods (No. 36–1961, No. 3; No. 8–1961 and No. 85–1963, respectively) and showed no break in color when exposed in a Fade-Ometer up to a total of 60 hours in accordance with AATCC test procedure No. 16A–1964, the light fastness corresponding to a rating of L6 minimum.

EXAMPLES 2–7

In these examples, pieces of the same fabric used in Example 1 were dyed following the general procedure described in Example 1 with various nitrosophenols. Samples of the dyed fabric were then tested according to the above AATCC test procedures and all showed excellent wash, crock and Perclene (tetrachloroethylene) fastness. Strips of the dyed fabric in each case were exposed in a Fade-Ometer for successive periods of 20, 40 and 60 hours. The nitrosophenol used, the color formed on the fabric and the Fade-Ometer rating of fastness is tabulated below.

| Ex. | Dyestuff intermediate | Color | Fade-Ometer rating |
| --- | --- | --- | --- |
| 2 | 2-nitroso-1-naphthol | Copper colored | Excellent. |
| 3 | 3-dimethylcarbamoyl-1-nitroso-2-naphthol. | Pale mustard | Good. |
| 4 | 5-methoxy-2-nitrosophenol | Orange | Very good. |
| 5 | 2-nitroso-5-dimethyl-amino-phenol. | Yellow-brown | Good. |
| 6 | Acenaphthenequinone monoxime (tautomeric form). | Pale yellow | Do. |
| 7 | 3-bromo-1-nitroso-2-naphthol. | Mustard yellow | Very good. |

EXAMPLE 8

The procedure of Example 1 was duplicated and the dyed fabric was exposed in a Fade-Ometer until fabric failure was observed. At 240 hours, the first observable break in shade occurred, which corresponds to a light fastness rating of L8. At 456 hours, the fabric still showed color retention. Fabric failure was observed between 450 and 480 hours, demonstrating that there had been no loss in stability of the fabric by the reaction of the nitrosonaphthol with the nickel phenolate stabilizer.

What I claim and desire to protect by Letters Patent is:

1. The process of producing dyed stereoregular polypropylene fibers which comprises contacting, at elevated temperature, filamentary material made of stereoregular polypropylene containing a nickel phenolate of a bis(p-alkylphenol) sulfone with an orthonitrosophenol.

2. The process of claim 1 wherein the nickel phenolate is the nickel phenolate of bis(p-tetramethylbutylphenol) sulfone.

3. The process of claim 2 wherein said ortho-nitrosophenol is 1-nitroso-2-naphthol.

4. The process of claim 2 wherein said ortho-nitrosophenol is 2-nitroso-1-naphthol.

5. The process of claim 2 wherein said ortho-nitrosophenol is 5-methoxy-2-nitrosophenol.

6. The process of claim 2 wherein said ortho-nitrosophenol is 3-bromo-1-nitroso-2-naphthol.

7. The process of claim 2 wherein said ortho-nitrosophenol is 5-dimethylamino-2-nitrosophenol.

References Cited

UNITED STATES PATENTS

| 2,205,663 | 6/1940 | Lecher et al. | 8—45 |
| 2,491,928 | 12/1949 | Miller et al. | 8—42 |
| 3,275,595 | 9/1966 | Breslow. | |

NORMAN G. TORCHIN, *Primary Examiner.*

T. J. HERBERT, JR., *Assistant Examiner.*

U.S. Cl. X.R.

8—55